(12) United States Patent
Mashio et al.

(10) Patent No.: US 11,031,604 B2
(45) Date of Patent: Jun. 8, 2021

(54) CATALYST AND ELECTRODE CATALYST LAYER, MEMBRANE ELECTRODE ASSEMBLY, AND FUEL CELL USING THE CATALYST

(71) Applicant: NISSAN MOTOR CO., LTD., Yokohama (JP)

(72) Inventors: Tetsuya Mashio, Yokohama (JP); Yoshihisa Furuya, Fujisawa (JP); Ken Akizuki, Nishitokyo (JP); Atsushi Ohma, Yokohama (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/529,031

(22) Filed: Aug. 1, 2019

(65) Prior Publication Data

US 2019/0355995 A1 Nov. 21, 2019

Related U.S. Application Data (62) Division of application No. 14/786,479, filed as application No. PCT/JP2014/060635 on Apr. 14, 2014, now Pat. No. 10,535,881.

(30) Foreign Application Priority Data

Apr. 25, 2013 (JP) .................................. 2013-092911

(51) Int. Cl.
*H01M 4/86* (2006.01)
*H01M 4/92* (2006.01)
(Continued)

(52) U.S. Cl.
CPC ......... *H01M 4/8605* (2013.01); *H01M 4/921* (2013.01); *H01M 4/925* (2013.01);
(Continued)

(58) Field of Classification Search
CPC ....... H01M 4/925; H01M 4/926; H01M 4/921
See application file for complete search history.

(56) References Cited

U.S. PATENT DOCUMENTS

| 5,866,423 A | 2/1999 | Sugawara et al. |
| 6,242,260 B1 | 6/2001 | Sugawara et al. |

(Continued)

FOREIGN PATENT DOCUMENTS

| EP | 1 852 180 A1 | 11/2007 |
| EP | 2 990 105 A1 | 3/2016 |

(Continued)

OTHER PUBLICATIONS

USPTO Office Action, U.S. Appl. No. 14/786,675, dated Nov. 29, 2019, 8 pages.

(Continued)

*Primary Examiner* — Stephan J Essex
(74) *Attorney, Agent, or Firm* — Foley & Lardner LLP (57) ABSTRACT

Provided is a catalyst having excellent gas transportability. Disclosed is a catalyst comprising a catalyst support and a catalyst metal supported on the catalyst support, wherein the catalyst includes pores having a radius of less than 1 nm and pores having a radius of 1 nm or more, wherein a pore volume of the pores having a radius of less than 1 nm is 0.3 cc/g support or more or a mode radius of a pore distribution of the pores having a radius of less than 1 nm is 0.3 nm or more and less than 1 nm, and wherein the catalyst metal is supported inside the pores having a radius of 1 nm or more.

14 Claims, 2 Drawing Sheets

(51) Int. Cl.
  *H01M 8/1004* (2016.01)
  *H01M 8/1018* (2016.01)
  *H01M 8/0234* (2016.01)

(52) U.S. Cl.
  CPC ......... *H01M 4/926* (2013.01); *H01M 8/1004* (2013.01); *H01M 4/923* (2013.01); *H01M 8/0234* (2013.01); *H01M 2008/1095* (2013.01); *H01M 2250/20* (2013.01); *Y02T 90/40* (2013.01)

(56) References Cited

U.S. PATENT DOCUMENTS

| | | | |
|---|---|---|---|
| 6,277,513 | B1 | 8/2001 | Swathirajan et al. |
| 6,398,858 | B1 | 6/2002 | Yu et al. |
| 6,812,187 | B1 | 11/2004 | Pak et al. |
| 8,114,372 | B2 | 2/2012 | Pak et al. |
| 9,156,694 | B2 | 10/2015 | Morishita |
| 9,947,934 | B2 | 4/2018 | Akizuki et al. |
| 2002/0019308 | A1 | 2/2002 | Hitomi et al. |
| 2003/0045425 | A1 | 3/2003 | Ruth et al. |
| 2003/0104936 | A1 | 6/2003 | Mao et al. |
| 2003/0108481 | A1 | 6/2003 | Igarashi et al. |
| 2004/0131919 | A1 | 7/2004 | Yasumoto et al. |
| 2004/0248730 | A1 | 12/2004 | Kim et al. |
| 2005/0095456 | A1 | 5/2005 | Takeda |
| 2005/0227862 | A1 | 10/2005 | Cao et al. |
| 2005/0282061 | A1 | 12/2005 | Campbell |
| 2006/0051657 | A1 | 3/2006 | Terada et al. |
| 2006/0093893 | A1 | 5/2006 | Matsuo et al. |
| 2006/0099139 | A1 | 5/2006 | Webster Long et al. |
| 2006/0105232 | A1 | 5/2006 | Tanuma |
| 2007/0122334 | A1 | 5/2007 | Pak et al. |
| 2007/0224479 | A1 | 9/2007 | Takokoro et al. |
| 2007/0270305 | A1* | 11/2007 | Pak .................. H01M 4/885 502/172 |
| 2008/0145733 | A1 | 6/2008 | Asazawa et al. |
| 2008/0182745 | A1 | 7/2008 | Finkelshtain et al. |
| 2008/0207442 | A1 | 8/2008 | Pfeifer et al. |
| 2009/0047559 | A1 | 2/2009 | Terada et al. |
| 2010/0092830 | A1 | 4/2010 | Hayashi et al. |
| 2011/0058308 | A1 | 3/2011 | Nishi et al. |
| 2011/0097583 | A1 | 4/2011 | Tenninson et al. |
| 2011/0223494 | A1* | 9/2011 | Feaver ............. H01M 4/9041 429/405 |
| 2011/0244363 | A1 | 10/2011 | Min et al. |
| 2011/0318254 | A1 | 12/2011 | Morishita |
| 2012/0100461 | A1 | 4/2012 | Iden et al. |
| 2012/0149545 | A1 | 6/2012 | Takahashi et al. |
| 2013/0244137 | A1 | 9/2013 | Tada et al. |
| 2014/0199609 | A1 | 7/2014 | Iden et al. |
| 2014/0287344 | A1 | 9/2014 | Suzue et al. |
| 2015/0352522 | A1 | 12/2015 | Mizuuchi et al. |
| 2016/0064744 | A1 | 3/2016 | Mashio et al. |
| 2016/0072134 | A1 | 3/2016 | Ohma et al. |
| 2016/0079605 | A1 | 3/2016 | Mashio et al. |
| 2016/0079606 | A1 | 3/2016 | Mashio et al. |
| 2017/0331134 | A1 | 11/2017 | Iden et al. |

FOREIGN PATENT DOCUMENTS

| | | |
|---|---|---|
| EP | 2 990 109 A1 | 3/2016 |
| JP | 61-050639 A | 3/1986 |
| JP | 05-345130 A | 12/1993 |
| JP | 06-196171 A | 7/1994 |
| JP | 09-257687 A | 10/1997 |
| JP | 2001-157841 A | 6/2001 |
| JP | 2001-300324 A | 10/2001 |
| JP | 2003-201417 A | 7/2003 |
| JP | 2004-025024 A | 1/2004 |
| JP | 2004-217507 A | 8/2004 |
| JP | 2005-135817 A | 5/2005 |
| JP | 2005-515063 A | 5/2005 |
| JP | 2006-155921 A | 6/2006 |
| JP | 2006-156154 A | 6/2006 |
| JP | 2007-220384 A | 8/2007 |
| JP | 2007-250274 A | 9/2007 |
| JP | 2007-532288 A | 11/2007 |
| JP | 2008-517750 A | 5/2008 |
| JP | 2008-269850 A | 11/2008 |
| JP | 2009-035598 A | 2/2009 |
| JP | 2010-015970 A | 1/2010 |
| JP | 2010-208887 A | 9/2010 |
| JP | 2011-119209 A | 6/2011 |
| JP | 4715842 B2 | 7/2011 |
| JP | 2012-124001 A | 6/2012 |
| JP | 2012-174623 A | 9/2012 |
| JP | 2013-109856 A | 6/2013 |
| JP | 2013-131420 A | 7/2013 |
| WO | WO-2005/083818 A1 | 9/2005 |
| WO | WO-2006/045606 A1 | 5/2006 |
| WO | WO 2009/075264 A1 | 6/2009 |
| WO | WO-2010/143311 A1 | 12/2010 |
| WO | WO-2012/053638 A1 | 4/2012 |
| WO | WO-2012/077598 A1 | 6/2012 |
| WO | WO-2014/129597 A1 | 8/2014 |
| WO | WO-2014/175098 A1 | 10/2014 |
| WO | WO-2014/175107 A1 | 10/2014 |

OTHER PUBLICATIONS

USPTO Notice of Allowance, U.S. Appl. No. 14/786,056, dated Sep. 13, 2019, 11 pages.
U.S. Appl. No. 14/786,056, filed Oct. 21, 2015, Nissan Motor Co., LTD., et al.
U.S. Appl. No. 14/786,470, filed Oct. 22, 2015, Nissan Motor Co., LTD., et al.
U.S. Appl. No. 14/786,281, filed Oct. 22, 2015, Nissan Motor Co., LTD., et al.
U.S. Appl. No. 14/786,632, filed Oct. 23, 2015, Nissan Motor Co., LTD., et al.
U.S. Appl. No. 14/786,675, filed Oct. 23, 2015, Nissan Motor Co., LTD., et al.
Antolini et al., Carbon Supports for Low-Temperature Fuel Cell Catalysts, Applied Catalysis B: Environmental, vol. 88, No. 1-2, Apr. 29, 2009, pp. 1-24.
Baizeng Fang et al., Ordered Hierarchical Nanostructured Carbon as a Highly Efficient Cathode Catalyst Support in Proton Exchange Membrane Fuel Cell, Chemistry of Materials, 21 (5), 2009, pp. 789-796.
English translation of JP 2007-250574 A—2007.
Environment Conscious New Material Series, Fuel Cell Material, published by Nikkan Kogyo Shimbum Ltd., 2007, 1st Edition, pp. 109-111.
European Extended Search Report, dated Oct. 6, 2017, 11 pages.
Fan Xu et al., "Investigation of the Carbon Corrosion Process for Polymer Electrolyte Fuel Cells Using a Rotating Disk Electrode Technique," Purdue e-Pubs, Purdue University, Paper 652, Birck and NCN Publications, 2010, 10 pages.
Ma et al. F NMR Studies of Nation Ionomer Adsorption on PEMFC Catalysts and Supporting Carbons. Solid Stat Ionic. vol. 178. Issue 29-30. Dec. 2007, pp. 1568-1575.
Subbaraman et al., Three Phase Interfaces at Electrified Metal-Solid Electrolyte System 1. Study of the Pt(hkl)-Nafion Interface, J Phys Chem C 2010, 114 (18), pp. 8414-8422.
USPTO Notice of Allowance, U.S. Appl. No. 14/786,056, dated Mar. 8, 2018, 8 pages.
USPTO Office Action, U.S. Appl. No. 15/522,023, dated May 3, 2018, 20 pages.
USPTO Office Action, U.S. Appl. No. 14/786,675, dated Jun. 1, 2018, 8 pages.
USPTO Office Action, U.S. Appl. No. 14/786,056, dated Jul. 17, 2018, 16 pages.
USPTO Office Action, U.S. Appl. No. 15/522,023, dated Oct. 9, 2018, 11 pages.
USPTO Office Action, U.S. Appl. No. 14/786,056, dated Nov. 16, 2018, 13 pages.

(56) References Cited

OTHER PUBLICATIONS

USPTO Office Action, U.S. Appl. No. 14/786,675, dated Nov. 26, 2018, 8 pages.
USPTO Advisory Action, U.S. Appl. No. 14/786,056, dated Mar. 20, 2019, 3 pages.
USPTO Notice of Allowance, U.S. Appl. No. 15/522,023, dated Mar. 4, 2019, 13 pages.
USPTO Office Action, U.S. Appl. No. 14/786,056, dated May 2, 2019, 13 pages.
USPTO Office Action, U.S. Appl. No. 14/786,675, dated Jun. 13, 2019,(including US 2014/0205929, US 2011/0223494, WO 2013/027627).
Soboleva, T. et al., "On the Micro~, Meso~, and Macroporous Structures of Polymer Electrolyte Membrane Fuel Cell Catalyst Layers", *ACS Applied Materials and Interfaces*, vol. 2, No. 2, (Feb. 24, 2010), pp. 375-384.
Vol'fkovich, Yu. M, et al., Porous Structure of the Catalyst Layers of Electrodes in a Proton-Exchange Membrane Fuel Cell: A Stage-by-Stage Study, *Russian Journal of Electrochemistry*, vol. 46, No. 3, (Mar. 2010), pp. 336-344.
"Vulcan XC72R," Cabot Corporation, URL:http://search.proquest.com/docview/884297145, Nov. 30, 2002.
Wang et al: "Investigation of Carbon Corrosion in Polymer Electrolyte Fuel Cells Using Steam Etching," Materials Chemistry and Physics, Switzerland, Oct. 1, 2010, vol. 123, No. 2-3, pp. 761-766.
Xiaoming Ren et al., Oxygen Reduction Reaction Catalyst on Lithium/Air Battery Discharge Performance, Journal of Materials Chemistry, Vo. 21, No. 27, Jan. 1, 2011, pp. 10118-10125.
Xue Liu et al., "Graphene supported platinum nanoparticles as anode electrocatalyst for direct borohydride fuel cell," International Journal of Hydrogen Energy, vol. 37, No. 23, Dec. 1, 2012, pp. 17984-17991, XP055410279.
USPTO Office Action, U.S. Appl. No. 14/786,675, dated Jun. 12, 2020, 12 pages.

\* cited by examiner

CATALYST AND ELECTRODE CATALYST LAYER, MEMBRANE ELECTRODE ASSEMBLY, AND FUEL CELL USING THE CATALYST

CROSS-REFERENCE TO RELATED APPLICATIONS

This application is a divisional of U.S. application Ser. No. 14/786,479, which is the U.S. National Phase of PCT/JP2014/060635 filed Apr. 14, 2014, which claims priority from Japanese Patent Application No. 2013-092911 filed Apr. 25, 2013, the entire contents of all of which are incorporated herein by reference.

TECHNICAL FIELD

The present invention relates to a catalyst, particularly an electrode catalyst used for a fuel cell (PEFC) and an electrode catalyst layer, a membrane electrode assembly, and a fuel cell using the catalyst.

BACKGROUND ART

A polymer electrolyte fuel cell using a proton conductive solid polymer membrane operates at a low temperature in comparison to other types of fuel cells, for example, a solid oxide fuel cell or a molten carbonate fuel cell. For this reason, the polymer electrolyte fuel cell has been expected to be used as a power source for energy storage system or a driving power source for a vehicle such as a car, and practical uses thereof have been started.

In general, such a polymer electrolyte fuel cell uses expensive metal catalyst represented by platinum (Pt) or a Pt alloy, which leads to high cost of the fuel cell. Therefore, development of techniques capable of lowering the cost of the fuel cell by reducing a used amount of noble metal catalyst has been required.

For example, Patent Literature 1 discloses an electrode catalyst having catalyst metal particles supported on a conductive support, wherein an average particle diameter of the catalyst metal particles is larger than an average pore diameter of fine pores of the conductive supports. The Patent Literature 1 discloses that, according to the above-described configuration, the catalyst particles are not allowed to enter the fine pores of the supports, so as to increase a ratio of the catalyst metal particles used in a three phase boundary, and thus, to improve use efficiency of expensive noble metal.

CITATION LIST

Patent Literature

Patent Literature 1: JP-A-2007-250274 (US 2009/0047559 A1)

SUMMARY OF INVENTION

However, the catalyst disclosed in the Patent Literature 1 has problems in that the electrolyte and the catalyst metal particles are in contact with each other, so that the catalyst activity decreases. On the other hand, if the catalyst metals are supported inside fine pores which the electrolyte cannot enter so as for the electrolyte and the catalyst metal particles not to be in contact with each other, a transporting distance of a gas such as oxygen is increased, and thus, a gas transportability is deteriorated, a sufficient catalyst activity cannot be exhibited, and the catalyst performance is deteriorated under high load conditions.

The present invention has been made in light of the aforementioned circumstances and aims at providing a catalyst having excellent catalyst activity and excellent gas transportability.

Another object of the present invention is to provide an electrode catalyst layer, a membrane electrode assembly, and a fuel cell having an excellent power generation performance.

The present inventors have intensively studied to solve the aforementioned problems, to find that the problems can be solved by a catalyst having a specific pore distribution, and eventually the present invention has been completed.

DESCRIPTION OF EMBODIMENTS

A catalyst (in this description, also referred to as an "electrode catalyst") of the present invention is configured to comprise a catalyst support and a catalyst metal supported on the catalyst support. Herein, the catalyst satisfies the following features (a) to (c):

(a) the catalyst contains pores (primary pores) having a radius of less than 1 nm and pores (primary pores) having a radius of 1 nm or more;

(b) a pore volume of the pores having a radius of less than 1 nm is 0.3 cc/g support or more; and (c) the catalyst metal is supported inside the pores having a radius of 1 nm or more.

Also, a catalyst of the present invention is configured to comprise a catalyst support and a catalyst metal supported on the catalyst support. Herein, the catalyst satisfies the following features (a), (d) and (c):

(a) the catalyst contains pores having a radius of less than 1 nm and pores having a radius of 1 nm or more;

(d) a mode radius of a pore distribution of the pores having a radius of less than 1 nm is 0.3 nm or more and less than 1 nm; and (c) the catalyst metal is supported inside the pores having a radius of 1 nm or more.

According to the catalyst having the above-described features, the catalyst metal is placed in a relatively large pore so as to suppress the contact with the electrolyte, and a gas transport path is secured by relatively small pores so as to improve gas transportability. As a result, a catalyst having excellent catalyst activity can be provided. In this description, a pore having a radius of less than 1 nm is referred to as "micropore". Also, in this description, a pore having a radius of 1 nm or more is referred to as "mesopore".

The present inventors have found that, in the catalyst disclosed in the Patent Literature 1, since the electrolyte (electrolyte polymer) is easily adsorbed on the surface of the catalyst in comparison with a gas such as oxygen, if the catalyst metals are in contact with the electrolyte (electrolyte polymer), a reaction active area of the surface of the catalyst is decreased. On the contrary, the present inventors have found that, even in the case where the catalyst is not in contact with the electrolyte, a the catalyst can be effectively used by forming three phase boundary with water. Therefore, the catalytic activity can be improved by taking the feature (c) where the catalyst metals are supported inside the mesopores which the electrolyte cannot enter.

On the other hand, in the case where the catalyst metals are supported inside the mesopores which the electrolyte cannot enter, since a transporting distance of a gas such as oxygen is increased, a gas transportability is deteriorated, and thus sufficient catalytic activity cannot be exhibited, and the catalyst performance is deteriorated under high load conditions. On the contrary, by the feature (b) where a sufficient pore volume of micropores which the catalyst metals cannot almost or never enter is secured, by the feature (d) where a mode diameter of micropores is set to be large, sufficient gas transport path can be attained. Therefore, a gas such as oxygen can be efficiently transported to the catalyst metals inside the mesopores, and namely, gas transport resistance can be reduced. By the feature, a gas (for example, oxygen) can pass through the micropores (gas transportability can be improved), and can be efficiently in contact with the catalyst.

Therefore, according to the present invention, since the micropores exist with a large volume, a reaction gas can be transported through the micropores (paths) to a surface of the catalyst metal(s) existing in the mesopores, and thus, gas transport resistance becomes small. Accordingly, the catalyst of the present invention can exhibit high catalyst activity, and namely, the catalyst reaction can be facilitated. For this reason, a membrane electrode assembly and a fuel cell including the catalyst layer using the catalyst according to the present invention have an excellent power generation performance.

Hereinafter, embodiments of a catalyst according to the present invention and embodiments of a catalyst layer, and a membrane electrode assembly (MEA) and a fuel cell using the catalyst will be described in detail appropriately with reference to the drawings. However, the present invention is not limited to the following embodiments. In addition, figures may be expressed in an exaggerated manner for the convenience of description, and in the figures, scaling factors of components may be different from actual values thereof. In addition, in the description of the embodiments of the present invention with reference to the drawings, the same components are denoted by the same reference numerals, and redundant description is omitted.

In this description, "X to Y" representing a range denotes "X or more and Y or less", and "weight" and "mass", "wt % and "mass %", "parts by weight", and "parts by mass" are used interchangeably. Unless otherwise noted, operation and the measurement of physical properties are performed at a room temperature (20 to 25° C.) and a relative humidity of 40 to 50%.

[Fuel Cell]

A fuel cell comprises a membrane electrode assembly (MEA) and a pair of separators including an anode-side separator having a fuel gas passage through which a fuel gas flows and a cathode-side separator having an oxidant gas passage through which an oxidant gas flows. The fuel cell according to the present embodiment has excellent durability and can exhibit a high power generation performance.

Figure 1:
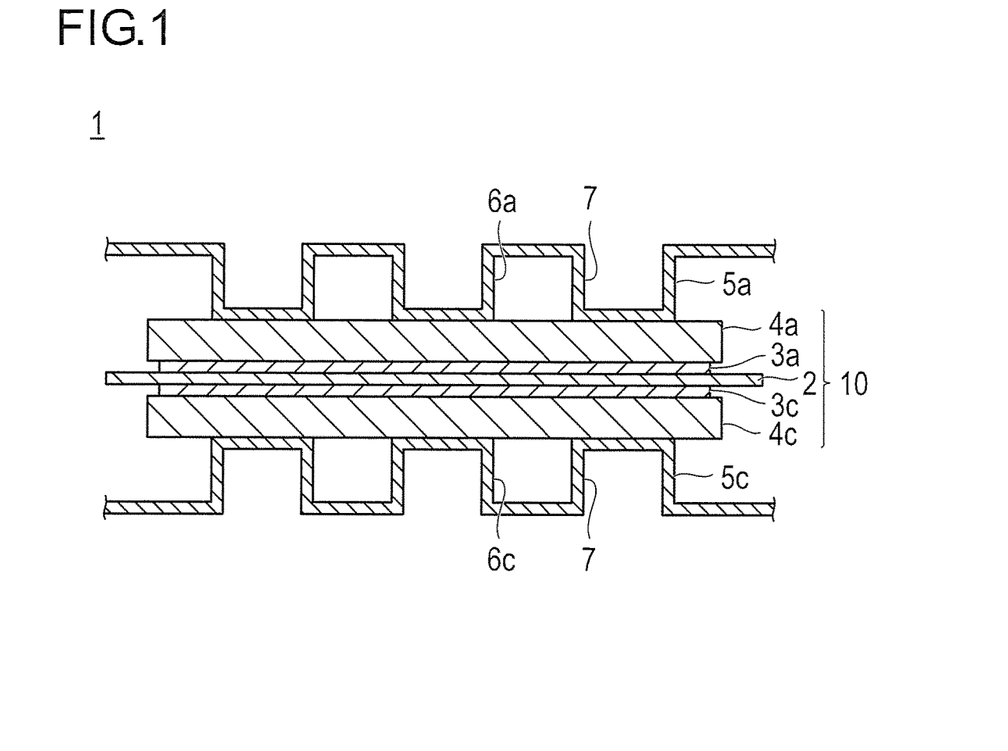
FIG. 1 is a schematic cross-sectional diagram illustrating a basic configuration of a polymer electrolyte fuel cell according to an embodiment of the present invention.

FIG. 1 is a schematic diagram illustrating a basic configuration of a polymer electrolyte fuel cell (PEFC) 1 according to an embodiment of the present invention. First, a PEFC 1 is configured to comprise a solid polymer electrolyte membrane 2 and a pair of catalyst layers (anode catalyst layer 3a and cathode catalyst layer 3c) interposing the solid polymer electrolyte membrane 2. A stacked body of the solid polymer electrolyte membrane 2 and the catalyst layers (3a, 3c) is sandwiched by a pair of gas diffusion layers (GDLs) (anode gas diffusion layer 4a and cathode gas diffusion layer 4c). In this manner, the solid polymer electrolyte membrane 2, a pair of the catalyst layers (3a, 3c), and a pair of gas diffusion layers (4a, 4c) in the stacked state constitute a membrane electrode assembly (MEA) 10.

In the PEFC 1, the MEA 10 is sandwiched by a pair of separators (anode separator 5a and cathode separator 5c). In FIG. 1, the separators (5a, 5c) are illustrated to be positioned at two ends of the MEA 10 illustrated. In general, in a fuel cell stack where a plurality of MEAs are stacked, the separator is also used as a separator for adjacent PEFC (not shown). In other words, MEAs in a fuel cell stack are sequentially stacked through the separator to constitute the stack. In an actual fuel cell stack, a gas sealing member is disposed between the separators (5a, 5c) and the solid polymer electrolyte membrane 2 and between the PEFC 1 and a different PEFC adjacent thereto. However, it is omitted in FIG. 1.

The separators (5a, 5c) are obtained by applying a pressing process to a thin board having a thickness of, for example, 0.5 mm or less to form a corrugating shape illustrated in FIG. 1. Convex portions of the separators 5a and 5c seen from the MEA side are in contact with the MEA 10. This secures an electrical connection with the MEA 10. Concave portions (spaces between the separator and the MEA formed by the corrugating shapes of the separators) of the separators (5a and 5c) seen from the MEA side function as a gas passage for passing a gas during the operation of the PEFC 1. Specifically, a fuel gas (for example, hydrogen) flows through a gas passage 6a of the anode separator 5a, and an oxidant gas (for example, air) flows through a gas passage 6c of the cathode separator 5c.

On the other hand, concave portions of the separators (5a, 5c) seen from the side opposite to the MEA side function as a coolant passage 7 for passing a coolant (e.g. water) for cooling the PEFC during the operation of the PEFC 1. In addition, manifolds (not shown) are typically installed in the separators. The manifold functions as a connecting means for connecting cells when the stack is configured. According to the configuration, a mechanical strength of the fuel cell stack can be secured.

In the embodiment illustrated in FIG. 1, each of the separators (5a, 5c) is formed in a corrugating shape. However, the separator is not limited to such a corrugating shape. If it can serve as a gas passage and a coolant passage, arbitrary shape such as a flat shape and a partially corrugating shape may be employed.

The fuel cell including the MEA according to the present invention as described above has excellent performance of power generation. Herein, the type of the fuel cell is not particularly limited. In the above description, the polymer electrolyte fuel cell is exemplified, but besides, an alkali fuel cell, a direct methanol fuel cell, a micro fuel cell, and the like may be exemplified. Among the fuel cells, due to a small size and capability of obtaining high density and high power, a polymer electrolyte fuel cell (PEFC) is preferred. In addition, the fuel cell is useful as a power source for energy storage system besides a power source for a vehicle such as a car where a mounting space is limited. Among the power sources, the fuel cell is particularly preferably used as a power source for a vehicle such as a car where a high output voltage is required after the stopping of operation for a relatively long time.

A fuel used for operating the fuel cell is not particularly limited. For example, hydrogen, methanol, ethanol, 1-propanol, 2-propanol, 1-butanol, secondary butanol, tertiary butanol, dimethyl ether, diethyl ether, ethylene glycol, diethylene glycol, or the like can be used. Among them, in view of capability of high output, hydrogen or methanol is preferably used.

In addition, although application use of the fuel cell is not particularly limited, the fuel cell is preferably applied to vehicles. The electrolyte membrane-electrode assembly according to the present invention has excellent power generation performance and durability, and can be downsized. Therefore, in terms of mountability on a vehicle, the fuel cell according to the present invention is particularly advantageous in the case where the fuel cell is applied to a vehicle.

Hereinafter, members constituting the fuel cell according to the present invention will be described in brief, but the scope of the present invention is not limited only to the following forms.

[Catalyst (Electrode Catalyst)]

Figure 2:
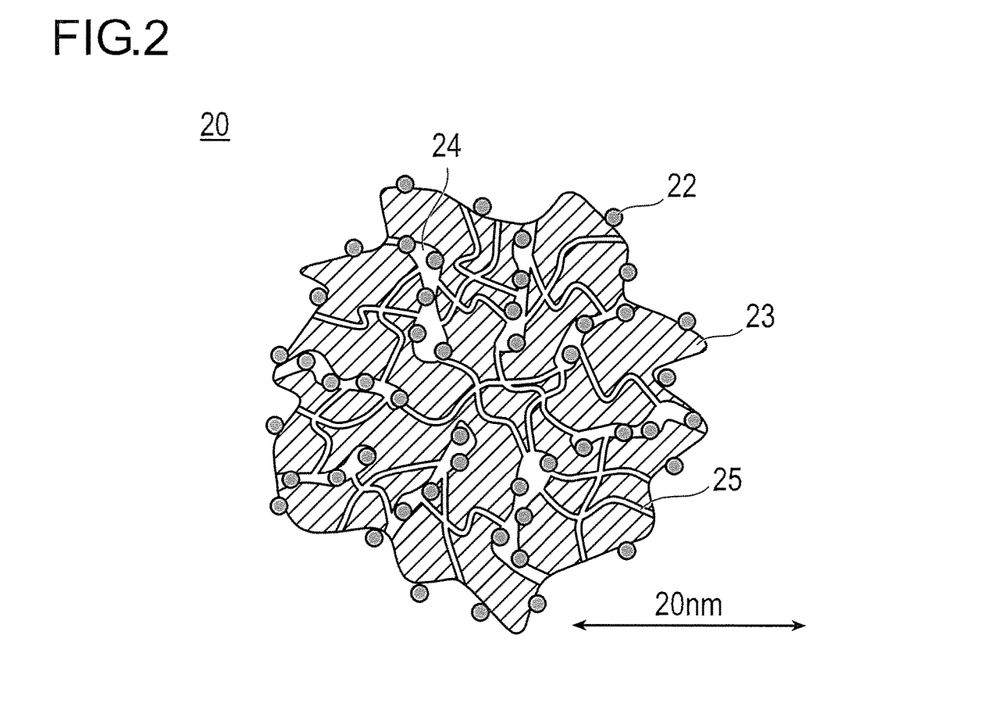
FIG. 2 is a schematic cross-sectional diagram illustrating a shape and a structure of a catalyst according to an embodiment of the present invention.

FIG. 2 is a schematic cross-sectional diagram illustrating a shape and a structure of a catalyst according to an embodiment of the present invention. As illustrated in FIG. 2, a catalyst 20 according to the present invention is configured to comprise catalyst metals 22 and a catalyst support 23. The catalyst 20 has pores (micropores) 25 having a radius of less than 1 nm and pores (mesopores) 24 having a radius of 1 nm or more. The catalyst metal(s) 22 is supported inside the mesopore 24. In addition, at least a portion of the catalyst metals 22 may be supported inside the mesopore 24, and other portions thereof may be supported on the surface of the support 23. However, in terms of preventing the contact of the electrolyte with the catalyst metal, substantially all the catalyst metals 22 are preferably supported inside the mesopores 24. As used herein, the expression "substantially all the catalyst metals" is not particularly limited if an amount which can improve a sufficient catalytic activity can be attained. The amount of "substantially all the catalyst metals" is preferably 50 wt % or more (upper limit: 100 wt %), more preferably 80 wt % or more (upper limit: 100 wt %), with respect to all the catalyst metals.

In this description, the state "the catalyst metals are supported inside the mesopores" can be confirmed by a decrease in volume of mesopores before and after the supporting of catalyst metals on a catalyst support. Specifically, a catalyst support (hereinafter, referred to as simply "support") contains micropores and mesopores, and the pores have the respective certain volumes. If catalyst metals are supported in the pore(s), the volumes of the pores are decreased. Therefore, the case where a difference between a volume of mesopores of a catalyst (support) before the supporting of catalyst metals and a volume of mesopores of a catalyst (support) after the supporting of catalyst metals [=(volume before supporting)−(volume after supporting)] exceeds 0 indicates that "the catalyst metals are supported inside the mesopore(s)". Similarly, the case where a difference between a volume of micropores of a catalyst (support) before the supporting of catalyst metals and a volume of micropores of a catalyst (support) after the supporting of catalyst metals [=(volume before supporting)−(volume after supporting)] exceeds 0 indicates that "the catalyst metals are supported inside the micropore(s)". Preferably, a larger number of catalyst metals are supported in mesopores than in micropores (namely, (decreased volume of mesopores before and after the supporting)>(decreased volume of micropores before and after the supporting)). By this, gas transport resistance can be reduced and a path for gas transportation can be sufficiently secured. In terms of reduced gas transport resistance and securing of a path for gas transportation, a decreased pore volume of mesopores before and after the supporting of the catalyst metals is preferably 0.02 cc/g or more, more preferably in the range of 0.02 to 0.21 cc/g.

A pore volume of pores (micropores) having a radius of less than 1 nm (of a catalyst after catalyst metal(s) is supported) is 0.3 cc/g support or more, and/or a mode radius of a pore distribution of micropores (of a catalyst after catalyst metal(s) is supported) (maximum frequency diameter) is 0.3 nm or more and less than 1 nm. Preferably, the pore volume of micropores is 0.3 cc/g support or more, and the mode radius of the pore distribution of micropores is 0.3 nm or more and less than 1 nm. If the pore volume of micropores and/or the mode diameter are within such ranges, enough micropores for gas transportation can be secured, so that gas transport resistance becomes small. Therefore, since a sufficient amount of a gas can be transported to a surface(s) of catalyst metal(s) existing in the mesopores via micropores (path), the catalyst according to the present invention can exhibit a high catalyst activity, and namely, the catalyst reaction can be facilitated. In addition, an electrolyte (ionomer) or liquid (for example, water) cannot enter the micropores, and only a gas can selectively pass through the micropores (gas transport resistance can be reduced). In terms of effects of improving gas transportability, the pore volume of micropores is more preferably in the range of 0.3 to 2 cc/g support, particularly preferably in the range of 0.4 to 1.5 cc/g support. The mode radius of the pore distribution of micropores is more preferably in the range of 0.4 to 1 nm, particularly in the range of 0.4 to 0.8 nm. In addition, in this description, the pore volume of pores having a radius of less than 1 nm is simply referred to as a "pore volume of micropores". Similarly, in this description, the mode radius of the pore distribution of micropores is simply referred to as a "mode diameter of micropores".

A pore volume of the pores (mesopores) having a radius of 1 nm or more (of a catalyst after catalyst metal(s) is supported) is not particularly limited, but it is preferably 0.4 cc/g support or more, more preferably in the range of 0.4 to 3 cc/g support, particularly preferably in the range of 0.4 to 1.5 cc/g support. If the pore volume is within such a range, a larger number of catalyst metals can be placed (supported) in the mesopores, and thus, an electrolyte and a catalyst metal(s) in the catalyst layer are physically separated from each other (contact of a catalyst metal(s) and an electrolyte can be more effectively suppressed and prevented). Therefore, activity of the catalyst metals can be more effectively used. In addition, due to existence of a large number of mesopores, the function and effects by the present invention can be further remarkably exhibited, so that a catalyst reaction can be more effectively facilitated. Also, the micropores function as a gas transport path, and thus, three phase boundary with water can be more remarkably formed, so that the catalytic activity can be more improved. In this description, the pore volume of pores having a radius of 1 nm or more is also simple referred to as a "pore volume of mesopores".

A mode radius (maximum frequent diameter) of a pore distribution of pores (mesopores) having a radius of 1 nm or more (of a catalyst after catalyst metal(s) is supported) is not particularly limited, but it is preferably in the range of 1 to 5 nm, more preferably in the range of 1 to 4 nm, particularly preferably in the range of 1 to 3 nm. If the mode diameter of the pore distribution of mesopores is within such a range, a sufficient number of catalyst metals can be placed (supported) in the mesopores, and thus, an electrolyte and a catalyst metal(s) in the catalyst layer are physically separated from each other (contact of a catalyst metal(s) and an electrolyte can be more effectively suppressed and prevented). Therefore, activity of the catalyst metals can be more effectively used. In addition, due to existence of a large volume of mesopores, the function and effects by the present invention can be further remarkably exhibited, so that a catalyst reaction can be more effectively facilitated. Also, the micropores function as a gas transport path, and thus, three phase boundary with water can be more remarkably formed, so that the catalytic activity can be more improved. In this description, the mode radius of the pore distribution of mesopores is also simply referred to as a "mode diameter of the mesopores".

A BET specific surface area (of a catalyst after catalyst metal(s) is supported) [BET specific surface area of catalyst per 1 g of support ($m^2$/g support)] is not particularly limited, but is 1000 $m^2$/g support or more, more preferably in the range of 1000 to 3000 $m^2$/g support, particularly preferably in the range of 1100 to 1800 $m^2$/g support. If the specific surface area is within the above-described range, since sufficient mesopores and micropores can be secured, enough micropores to transport a gas (lower gas transport resistance) can be secured, and a larger number of the catalyst metals can be placed (supported) in the mesopores. In addition, an electrolyte and catalyst metals in the catalyst layer can be physically separated from each other (contact between catalyst metals and an electrolyte can be more effectively suppressed and prevented). Therefore, activity of the catalyst metals can be more effectively used. Also, due to existence of a large number of the micropores and mesopores, the function and effects by the present invention can be further remarkably exhibited, so that a catalyst reaction can be more effectively facilitated. In addition, the micropores function as a gas transport path, and thus, a three-phase boundary with water is more remarkably formed, so that the catalytic activity can be more improved.

In this description, the "BET specific surface area ($m^2$/g support)" is measured by a nitrogen adsorption method. Specifically, about 0.04 to 0.07 g of a catalyst powder is accurately weighed and sealed in a sample tube. The sample tube is preliminarily dried in a vacuum drier at 90° C. for several hours, to obtain a sample for measurement. For the weighing, an electronic balance (AW220) produced by Shimadzu Co., Ltd. is used. In the case of a coated sheet, about 0.03 to 0.04 g of a net weight of a coat layer obtained by subtracting a weight of Teflon (registered trademark) (substrate) having the same area from a total weight of the coated sheet is used as a sample weight. Next, under the following measurement condition, a BET specific surface area is measured. In an adsorption side of adsorption and desorption isotherms, a BET plot is produced from a relative pressure (P/P0) range of about 0.00 to 0.45, and a surface area and a BET specific surface area are calculated from the slope and the intercept.

[Chem. 1]
<Measurement Conditions>
Measurement Apparatus: BELSORP 36, High-Precise Automatic Gas Adsorption Apparatus produced by BEL Japan, Inc.
Adsorption Gas: $N_2$
Dead Volume Measurement Gas: He
Adsorption Temperature: 77 K (Liquid Nitrogen Temperature)
Measurement Preparation: Vacuum Dried at 90° C. for several hours (After He Purging, Set on Measurement Stage)
Measurement Mode: Adsorption Process and Desorption Process in Isotherm
Measurement Relative Pressure $P/P_0$: about 0 to 0.99
Equilibrium Setting Time: 180 sec for 1 relative pressure The "pore radius (nm) of micropores" denotes a radius of pores measured by a nitrogen adsorption method (MP method). In addition, the "mode radius (nm) of a pore distribution of micropores" denotes a pore radius at a point taking a peak value (maximum frequency) in a differential pore distribution curve obtained by a nitrogen adsorption method (MP method). Herein, a lower limit of the pore radius of micropores is a lower limit value which can be measured by the nitrogen adsorption method, that is, 0.42 nm or more. Similarly, the "pore radius (nm) of mesopores" denotes a radius of pores measured by a nitrogen adsorption method (DH method). In addition, the "mode radius (nm) of a pore distribution of mesopores" denotes a pore radius at a point taking a peak value (maximum frequency) in a differential pore distribution curve obtained by a nitrogen adsorption method (DH method). Herein, an upper limit of the pore radius of mesopores is not particularly limited, but it is 5 nm or less.

The "pore volume of micropores" denotes a total volume of micropores having a radius of less than 1 nm existing in a catalyst, and is expressed by volume per 1 g of support (cc/g support). The "pore volume (cc/g support) of micropores" is calculated as an area (integration value) under a differential pore distribution curve obtained according to a nitrogen adsorption method (MP method). Similarly, the "pore volume of mesopores" denotes a total volume of mesopores having a radius of 1 nm or more existing in a catalyst, and is expressed by volume per 1 g of support (cc/g support). The "pore volume (cc/g support) of mesopores" is calculated as an area (integration value) under a differential pore distribution curve obtained according to a nitrogen adsorption method (DH method).

The "differential pore distribution" is a distribution curve obtained by plotting a pore diameter in the horizontal axis and a pore volume corresponding to the pore diameter in a catalyst in the vertical axis. Namely, when a pore volume of a catalyst obtained by a nitrogen adsorption method (MP method in case of the micropores; and DH method in case of the mesopores) is denoted by V and a pore diameter is denoted by D, a value (dV/d(log D)) is obtained by dividing the differential pore volume dV by a differential logarithm d(log D) of the pore diameter. Next, a differential pore distribution curve is obtained by plotting the dV/d(log D) for an average pore diameter in each section. A differential pore volume dV denotes an increment of pore volume between measurement points.

A method for measuring a radius and a pore volume of micropores by a nitrogen adsorption method (MP method) is not particularly limited. For example, methods disclosed in well-down literatures such as "Science of Adsorption" (second edition written by Kondo Seiichi, Ishikawa Tatsuo, and Abe Ikuo, Maruzen Co., Ltd.), "Fuel Cell Analysis Method" (compiled by Takasu Yoshio, Yoshitake Yu, and Ishihara Tatsumi of KAGAKU DOJIN), and an article written by R. Sh. Mikhail, S. Brunauer, and E. E. Bodor in J. Colloid Interface Sci., 26, 45 (1968) may be employed. In this description, the radius and pore volume of micropores by a nitrogen adsorption method (MP method) are a value measured by the method disclosed in the article written by R. Sh. Mikhail, S. Brunauer, and E. E. Bodor in J. Colloid Interface Sci., 26, 45 (1968).

A method for measuring a radius and a pore volume of mesopores by a nitrogen adsorption method (DH method) is not particularly limited. For example, methods disclosed in well-known literatures such as "Science of Adsorption" (second edition written by Kondo Seiichi, Ishikawa Tatsuo, and Abe Ikuo, Maruzen Co., Ltd.), "Fuel Cell Analysis Method" (compiled by Takasu Yoshio, Yoshitake Yu, and Ishihara Tatsumi of KAGAKU DOJIN), and an article by D. Dollion and G. R. Heal in J. Appl. Chem. 14, 109 (1964) may be employed. In this description, the radius and pore volume of mesopores by a nitrogen adsorption method (DH method) are a value measured by the method disclosed in the article written by D. Dollion and G. R. Heal in J. Appl. Chem. 14, 109 (1964).

A method of manufacturing a catalyst having a specific pore distribution as described above is not particularly limited, but it is important to make a pore distribution (micropores and mesopores) of a support typically the above-described pore distribution. Specifically, as a method of manufacturing a support having micropores and mesopores and having a pore volume of micropores of 0.3 cc/g support or more, the methods disclosed in JP-A-2010-208887 (US 2011/318254 A1, the same hereinafter), WO 2009/75264 (US 2011/058308 A1, the same hereinafter), or the like are preferably used. In addition, as a method of manufacturing a support having micropores and mesopores and having a mode radius of a pore distribution of micropores of 0.3 nm or more and less than 1 nm, the methods disclosed in JP-A-2010-208887, WO 2009/75264, or the like are preferably used.

A material of the support is not particularly limited if pores (primary pores) having above-described pore volume or mode radius can be formed inside the support and if the support has enough specific surface area and enough electron conductivity to support a catalyst component inside the mesopores in a dispersed state. Preferably, a main component is carbon. Specifically, carbon particles made of carbon black (Ketjen Black, oil furnace black, channel black, lamp black, thermal black, acetylene black, or the like), activated charcoal, or the like may be exemplified. The expression "main component is carbon" denotes that the support contains carbon atoms as a main component, and includes both of the configurations that the support consists only of carbon atoms and that the support substantially consists of carbon atoms. An element(s) other than carbon atom may be contained. The expression "substantially consists of carbon atoms" denotes that impurities of about 2 to 3 wt % or less can be contaminated.

More preferably, in view of easy formation of a desired pore space inside a support, carbon black is used; and particularly preferably, supports manufactured by the method disclosed in JP-A-2010-208887, WO 2009/75264, or the like is used.

Besides the aforementioned carbon materials, a porous metal such as Sn (tin) or Ti (titanium) or a conductive metal oxide can also be used as the support.

A BET specific surface area of a support may be a specific surface area enough to highly disperse and support a catalyst component thereon. The BET specific surface area of support is substantially equivalent to the BET specific surface area of catalyst. The BET specific surface area of support is preferably in the range of 1000 to 3000 m$^2$/g, more preferably in the range of 1100 to 1800 m$^2$/g. If the specific surface area is within such a range, since sufficient mesopores and micropores can be secured, enough micropores to transport a gas (lower gas transport resistance) can be secured, and a larger number of the catalyst metals can be placed (supported) in the mesopores. In addition, an electrolyte and catalyst metals in the catalyst layer can be physically separated from each other (contact between catalyst metals and an electrolyte can be more effectively suppressed and prevented). Therefore, activity of the catalyst metals can be more effectively used. Also, due to existence of a large number of the micropores and mesopores, the function and effects by the present invention can be further remarkably exhibited, so that a catalyst reaction can be more effectively facilitated. Further, a balance between dispersibility of a catalyst component on a catalyst support and an effective availability of a catalyst component can be appropriately controlled. In addition, the micropores function as a gas transport path, and thus, a three phase boundary with water is more remarkably formed, so that the catalytic activity can be more improved.

An average particle diameter of a support is preferably in the range of 20 to 100 nm. If the average primary particle diameter is within such a range, even in the case where the above-described pore structure is formed in the support, mechanical strength can be maintained, and a catalyst layer can be controlled within an appropriate range. As a value of the "average particle diameter of a support", unless otherwise noted, a value calculated as an average value of particle diameters of particles observed within several or several tens of fields by using observation means such as a scanning electron microscope (SEM) or a transmission electron microscope (TEM) is employed. In addition, the "particle diameter" denotes a maximum distance among distances between arbitrary two points on an outline of a particle.

In the present invention, there is no need to use the above-described granular porous support, so long as the support has the above-described pore distributions of micropores and mesopores in the catalyst.

Namely, as the support, a non-porous conductive support, nonwoven fabric, carbon paper, carbon cloth, or the like made of carbon fiber constituting a gas diffusion layer, or the like may be exemplified. In this case, the catalyst can be supported on the non-porous conductive support or can be directly attached to the nonwoven fabric, the carbon paper, the carbon cloth, or the like made of the carbon fiber constituting the gas diffusion layer of the membrane electrode assembly.

A catalyst metal which can be used in the present invention performs catalysis of electrochemical reaction. As a catalyst metal used for an anode catalyst layer, a well-known catalyst can be used in a similar manner without particular limitation if the catalyst has catalytic effects on oxidation reaction of hydrogen. In addition, as a catalyst metal used for a cathode catalyst layer, a well-known catalyst can be used in a similar manner without particular limitation if the catalyst has catalytic effects on reduction reaction of oxygen. Specifically, the catalyst metal can be selected among metals such as platinum, ruthenium, iridium, rhodium, palladium, osmium, tungsten, lead, iron, copper, silver, chromium, cobalt, nickel, manganese, vanadium, molybdenum, gallium, and aluminum, and alloys thereof.

Among them, in view of improved catalytic activity, poison resistance to carbon monoxide or the like, heat resistance, or the like, a catalyst metal containing at least platinum is preferably used. Namely, the catalyst metal preferably is platinum or contains platinum and a metal component other than the platinum, more preferably is platinum or a platinum-containing alloy. Such a catalyst metal can exhibit high activity. Although a composition of an alloy depends on a kind of the metal constituting the alloy, a content of platinum may be in the range of 30 to 90 atom %, and a content of a metal constituting the alloy together with platinum may be in the range of 10 to 70 atom %. In general, an alloy is obtained by mixing a metal element with at least one metal element or non-metal element, and is a general term for substances having metallic properties. The structure of the alloy includes an eutectic alloy which is a mixture where component elements form separate crystals, an alloy where component elements are completely fused to form a solid solution, an alloy where component elements form a intermetallic compound or a compound between a metal and a non-metal, and the like, and any one thereof may be employed in the present application. A catalyst metal used in an anode catalyst layer and a catalyst metal used in a cathode catalyst layer can be appropriately selected from the aforementioned alloys. In this description, unless otherwise noted, the description of the catalyst metal for the anode catalyst layer and the catalyst metal for the cathode catalyst layer have the same definition. However, the catalyst metal for the anode catalyst layer and the catalyst metal for the cathode catalyst layer are not necessarily the same, and the catalyst metals can be appropriately selected so that the desired functions described above can be attained.

A shape and size of the catalyst metal (catalyst component) are not particularly limited, but the shapes and sizes of well-known catalyst components may be employed. As the shape, for example, a granular shape, a squamous shape, a laminar shape, or the like may be used, but the granular shape is preferred. In this case, an average particle diameter of catalyst metals (catalyst metal particles) is not particularly limited, but it is preferably 3 nm or more, more preferably more than 3 and 30 nm or less, particularly preferably more than 3 and 10 nm or less. If the average particle diameter of catalyst metals is 3 nm or more, the catalyst metals are relatively strongly supported in the mesopores, and contact with an electrolyte in a catalyst layer can be more effectively suppressed and prevented. In addition, the micropores are not blocked by the catalyst metals but remain, and thus, a gas transport path can be more efficiently secured, so that gas transport resistance can be further reduced. In addition, elution due to a change in voltage can be prevented, and temporal degradation in performance can be also suppressed. Therefore, catalytic activity can be further improved, namely, catalyst reaction can be more efficiently facilitated. On the other hand, if the average particle diameter of the catalyst metal particles is 30 nm or less, the catalyst metals can be supported inside the mesopores of the supports by a simple method, so that a covering ratio of catalyst metals with an electrolyte can be reduced. In the present invention, the "average particle diameter of catalyst metal particles" can be measured as an average value of a crystallite diameter obtained from a half-value width of a diffraction peak of a catalyst metal component in X-ray diffraction (XRD) spectroscopy or as an average value of a particle diameter of catalyst metal particles examined from a transmission electron microscope (TEM).

In this embodiment, a catalyst content per unit catalyst-coated area (mg/cm$^2$) is not particularly limited so long as a sufficient dispersibility of catalyst on a support and power generation performance can be obtained. For example, the catalyst content is in the range of 0.01 to 1 mg/cm$^2$. However, in the case where the catalyst contains platinum or a platinum-containing alloy, a platinum content per unit catalyst-coated area is preferably 0.5 mg/cm$^2$ or less. The usage of expensive noble metal catalyst represented by platinum (Pt) or a platinum alloy induces an increased cost of a fuel cell. Therefore, it is preferable to reduce the cost by decreasing an amount (platinum content) of the expensive platinum to the above-described range. A lower limit is not particularly limited so long as power generation performance can be attained, and for example, the lower limit value is 0.01 mg/cm$^2$ or more. The content of the platinum is more preferably in the range of 0.02 to 0.4 mg/cm$^2$. In this embodiment, since the activity per catalyst weight can be improved by controlling the pore structure of the support, the amount of an expensive catalyst can be reduced.

In this description, an inductively coupled plasma emission spectroscopy (ICP) is used for measurement (determination) of a "content of catalyst (platinum) per unit catalyst-coated area (mg/cm$^2$)". A method of obtaining a desired "content of catalyst (platinum) per unit catalyst-coated area (mg/cm$^2$)" can be easily performed by the person skilled in the art, and the content can be adjusted by controlling a slurry composition (catalyst concentration) and a coated amount.

A supported amount (in some cases, referred to as a support ratio) of a catalyst on a support is preferably in the range of 10 to 80 wt %, more preferably in the range of 20 to 70 wt %, with respect to a total amount of the catalyst support (that is, the support and the catalyst). The supported amount within the aforementioned range is preferable in terms of sufficient dispersibility of a catalyst component on a support, improved power generation performance, economical merit, and catalytic activity per unit weight.

[Catalyst Layer]

As described above, the catalyst of the present invention can reduce gas transport resistance, so that the catalyst can exhibit a high catalytic activity and in other words, catalyst reaction can be promoted. Therefore, the catalyst of the present invention can be advantageously used for an electrode catalyst layer for fuel cell. Namely, the present invention provides an electrode catalyst layer for fuel cell including the catalyst and the electrode catalyst according to the present invention.

Figure 3:
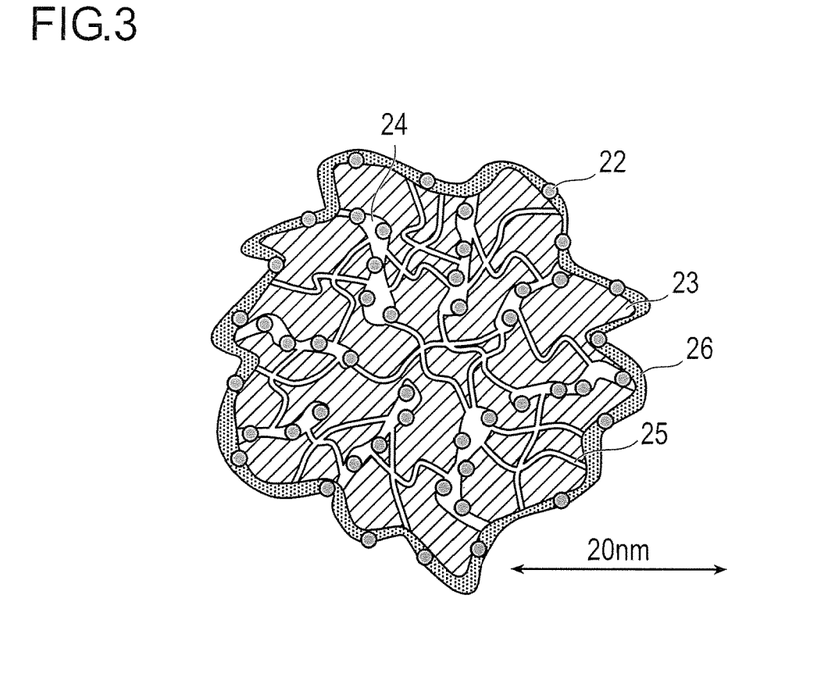
FIG. 3 is a schematic diagram illustrating a relationship between a catalyst and an electrolyte in a catalyst layer according to an embodiment of the present invention.

FIG. 3 is a schematic diagram illustrating a relationship between a catalyst and an electrolyte in a catalyst layer according to an embodiment of the present invention. As illustrated in FIG. 3, in the catalyst layer according to the present invention, although the catalyst is coated with the electrolyte 26, the electrolyte 26 does not enter the mesopores 24 (and the micropores 25) of the catalyst (support 23). Therefore, although the catalyst metal 22 on the surface of the support 23 is in contact with the electrolyte 26, the catalyst metal 22 supported in the mesopore 24 is not in contact with the electrolyte 26. The catalyst metal in the mesopore forms three-phase boundary with an oxygen gas and water in a state that the catalyst metal is not in contact with the electrolyte, so that a reaction active area of the catalyst metals can be secured.

Although the catalyst according to the present invention may exist either in a cathode catalyst layer or an anode catalyst layer, the catalyst is preferably used in a cathode catalyst layer. As described above, although the catalyst according to the present invention is not in contact with the electrolyte, the catalyst can be effectively used by forming three-phase boundary of the catalyst and water. This is because water is formed in the cathode catalyst layer.

An electrolyte is not particularly limited, but it is preferably an ion-conductive polymer electrolyte. Since the polymer electrolyte serves to transfer protons generated in the vicinity of the catalyst active material on a fuel electrode side, the polymer electrolyte is also referred to as a proton conductive polymer.

The polymer electrolyte is not particularly limited, but well-known knowledge in the art can be appropriately referred to. The polymer electrolytes are mainly classified into fluorine-based polymer electrolytes and hydrocarbon-based polymer electrolytes depending on a type of an ion-exchange resin as a constituent material.

As an ion-exchange resin constituting the fluorine-based polymer electrolyte, for example, perfluorocarbon sulfonic acid based polymers such as Nafion (registered trademark, produced by DuPont), Aciplex (registered trademark, produced by Asahi Kasei Co., Ltd.), and Flemion (registered trademark, produced by Asahi Glass Co., Ltd.), perfluorocarbon phosphoric acid based polymers, trifluorostyrene sulfonic acid based polymers, ethylene tetrafluoroethylene-g-styrene sulfonic acid based polymers, ethylene-tetrafluoroethylene copolymers, polyvinylidene fluoride-perfluorocarbon sulfonic acid based polymers, and the like may be exemplified. In terms excellent heat resistance, chemical stability, durability, and mechanical strength, the fluorine-based polymer electrolyte is preferably used, and a fluorine-based polymer electrolyte formed of a perfluorocarbon sulfonic acid based polymer is particularly preferably used.

As a hydrocarbon-based electrolyte, sulfonated polyether sulfones (S-PES), sulfonated polyaryl ether ketones, sulfonated polybenzimidazole alkyls, phosphonated polybenzimidazole alkyls, sulfonated polystyrenes, sulfonated polyether ether ketones (S-PEEK), sulfonated polyphenylenes (S—PPP), and the like may be exemplified. In terms of manufacturing advantages such as inexpensive raw materials, simple manufacturing processes, and high selectivity of materials, a hydrocarbon-based polymer electrolyte is preferably used. These ion-exchange resins may be singly used, or two or more resins may be used together. In addition, the material is not limited to the above-described material, but another material may be used.

With respect to the polymer electrolyte which serves to transfer protons, proton conductivity is important. In the case where EW of a polymer electrolyte is too large, ion conductivity with in the entire catalyst layer would be decreased. Therefore, the catalyst layer according to the embodiment preferably includes a polymer electrolyte having a small EW. Specifically, catalyst layer according to the embodiment preferably includes a polymer electrolyte having an EW of 1500 g/eq. or less, more preferably includes a polymer electrolyte having an EW of 1200 g/eq. or less, and particularly preferably includes a polymer electrolyte having an EW of 1000 g/eq. or less.

On the other hand, in the case where the EW is too small, since hydrophilicity is too high, water is hard to smoothly move. Due to such a point of view, the EW of polymer electrolyte is preferably 600 g/eq. or more. The EW (Equivalent Weight) represents an equivalent weight of an exchange group having proton conductivity. The equivalent weight is a dry weight of an ion exchange membrane per 1 eq. of ion exchange group, and is represented in units of "g/eq.".

It is preferable that the catalyst layer includes two types or more of polymer electrolytes having different EWs in a power generation surface, and in this case, among the polymer electrolytes, the polymer electrolyte having the lowest EW is used in an area where relative humidity of a gas in a passage is 90% or less. By employing such material arrangement, resistance is decreased irrespective of a current density area, so that cell performance can be improved. The EW of polymer electrolyte used in the area where relative humidity of the gas in a passage is 90% or less, that is, EW of polymer electrolyte having the lowest EW is preferably 900 g/eq. or less. By this, the above-described effects can be further more certainly and more remarkably attained.

The polymer electrolyte having the lowest EW is preferably used in an area of which temperature is higher than an average temperature of inlet and outlet for cooling water. By this, resistance is decreased irrespective of a current density area, so that cell performance can be further improved.

In terms decreased resistance value of a fuel cell system, the polymer electrolyte having the lowest EW is preferably provided in an area within the range of 3/5 or less of the passage length from a gas supply inlet of at least one of a fuel gas and an oxidant gas.

The catalyst layer according to the embodiment may include, between the catalyst and the polymer electrolyte, a liquid proton conducting material capable of connecting the catalyst and the polymer electrolyte in a proton conductible state. By introducing the liquid proton conducting material, a proton transport path through the liquid proton conducting material is provided between the catalyst and the polymer electrolyte, so that protons necessary for the power generation can be efficiently transported on the surface of the catalyst. By this, availability of the catalyst is improved, and thus an amount of used catalyst can be reduced while maintaining power generation performance. The liquid proton conducting material may be interposed between the catalyst and the polymer electrolyte. The liquid proton conducting material may be disposed in pores (secondary pores) between porous supports in a catalyst layer or may be disposed in pores (micropores or mesopores: primary pores) in porous supports.

The liquid proton conducting material is not particularly limited if the material has ion conductivity and has a function of forming a proton transport path between the catalyst and the polymer electrolyte. Specifically, water, a protic ionic liquid, an aqueous solution of perchloric acid, an aqueous solution of nitric acid, an aqueous solution of formic acid, an aqueous solution of acetic acid, and the like may be exemplified.

In the case of using water as the liquid proton conducting material, the water can be introduced as the liquid proton conducting material into the catalyst layer by wetting the catalyst layer with a small amount of liquid water or a humidified gas before the start of power generation. In addition, water generated through electrochemical reaction during the operation of a fuel cell may be used as the liquid proton conducting material. Therefore, in a state where a fuel cell starts to be operated, the liquid proton conducting material is not necessarily retained. For example, a surface distance between the catalyst and the electrolyte is preferably set to be a diameter of an oxygen ion constituting a water molecule, that is, 0.28 nm or more. By maintaining such a distance, water (liquid proton conducting material) can be interposed between the catalyst and the polymer electrolyte (in the liquid conducting material retaining portion) while maintaining the non-contact state between the catalyst and the polymer electrolyte, so that a proton transport path can be secured by water therebetween.

In the case of using a material such as an ionic liquid other than water as the liquid proton conducting material, the ionic liquid, the polymer electrolyte, and the catalyst are preferably allowed to be dispersed in a solution in the preparation of a catalyst ink. However, the ionic liquid may be added at the time of coating a catalyst layer substrate with a catalyst.

In the catalyst according to the present invention, a total area of the catalyst which is in contact with the polymer electrolyte is set to be smaller than a total area of the catalyst exposed to the liquid conducting material retaining portion.

Comparison of these areas can be performed, for example, by obtaining a magnitude relationship between capacitance of an electrical double layer formed in a catalyst-polymer electrolyte interface and capacitance of an electrical double layer formed in a catalyst-liquid proton conducting material interface in a state where the liquid conducting material retaining portion is filled with the liquid proton conducting material. Namely, since capacitance of an electrical double layer is proportional to an area of an electrochemically effective interface, if the capacitance of the electrical double layer formed in the catalyst-electrolyte interface is smaller than the capacitance of the electrical double layer formed in the catalyst-liquid proton conducting material interface, a contact area of the catalyst with the electrolyte is smaller than an area thereof exposed to the liquid conducting material retaining portion.

Herein, a measuring method for capacitance of an electrical double layer formed in a catalyst-electrolyte interface and capacitance of an electrical double layer formed in a catalyst-liquid proton conducting material interface, that is, a magnitude relationship between a contact area of the catalyst with the electrolyte and a contact area of the catalyst and the liquid proton conducting material (determination method for a magnitude relationship between a contact area of the catalyst and the electrolyte and an area of the catalyst exposed to the liquid conducting material retaining portion) will be described.

Namely, in the catalyst layer according to the embodiment, the following four types of interfaces can contribute as capacitance of electrical double layer (Cdl):

(1) catalyst-polymer electrolyte (C—S)
(2) catalyst-liquid proton conducting material (C-L)
(3) porous support-polymer electrolyte (Cr—S)
(4) porous support-liquid proton conducting material (Cr-L)

As described above, since capacitance of an electrical double layer is proportional to an area of an electrochemically effective interface, $Cdl_{C-S}$ (capacitance of an electrical double layer in a catalyst-polymer electrolyte interface) and $Cdl_{C-L}$ (capacitance of an electrical double layer in a catalyst-liquid proton conducting material interface) may be obtained. Therefore, the contribution of the four types of interfaces to capacitance of an electrical double layer (Cdl) can be identified as follows.

First, for example, under a high humidity condition such as 100% RH and under a lower humidity condition such as 10% RH or less, each capacitance of electrical double layers is measured. As a measurement method for the capacitance of electrical double layer, cyclic voltammetry, electrochemical impedance spectroscopy, or the like may be exemplified. From the comparison, the contribution of the liquid proton conducting material (in this case, "water"), that is, the above-described contributions (2) and (4) can be identified.

In addition, the contributions to capacitance of an electrical double layer can be identified by deactivating a catalyst, for example, in the case of using Pt as the catalyst, by deactivating the catalyst by supply CO gas to an electrode to be measured to allow CO to be adsorbed on the surface of Pt. In this state, as described above, under the high humidity condition and under the low humidity condition, each capacitance of electrical double layers is measured by the same method, and from the comparison, the contributions of the catalyst, that is, the above-described contributions (1) and (2) can be identified.

By using the above-described method, all the contributions (1) to (4) described above can be identified, the capacitance of the electrical double layer in the interface between the catalyst and the polymer electrolyte and the capacitance of the electrical double layer in the interface between the catalyst and the liquid proton conducting material can be obtained.

Namely, a measurement value (A) in a highly-humidified state can be regarded as capacitance of electrical double layer formed in all the interfaces (1) to (4), and a measurement value (B) in a lowly-humidified state can be regarded as capacitance of the electrical double layer formed in the interfaces (1) and (3). In addition, a measurement value (C) in a catalyst-deactivated and highly-humidified state can be regarded as capacitance of the electrical double layer formed in the interfaces (3) and (4), and a measurement value (D) in a catalyst-deactivated and lowly-humidified state can be regarded as capacitance of the electrical double layer formed in the interface (3).

Therefore, the difference between A and C can be regarded as the capacitance of the electrical double layer formed in the interfaces (1) and (2), and the difference between B and D can be regarded as the capacitance of the electrical double layer formed in the interface (1). Next, by calculating the difference between these values, i.e., (A-C)–(B-D), the capacitance of the electrical double layer formed in the interface (2) can be obtained. In addition, a contact area of the catalyst with the polymer electrolyte or an exposed area thereof to the conducting material retaining portion can be obtained by, for example, TEM (transmission electron microscope) tomography besides the above-described method.

If necessary, the catalyst layer may contain additives of a water repellent such as polytetrafluoroethylene, polyhexafluoropropylene, and tetrafluoroethylene-hexafluoropropylene copolymer, a dispersant such as a surfactant, a thickener such as glycerin, ethylene glycol (EG), polyvinyl alcohol (PVA), and propylene glycol (PG), a pore-forming agent, or the like.

A thickness (as a dried thickness) of the catalyst layer is preferably in the range of 0.05 to 30 µm, more preferably in the range of 1 to 20 µm, even more preferably in the range of 2 to 15 µm. The thickness can be applied to both of the cathode catalyst layer and the anode catalyst layer. However, the thickness of the cathode catalyst layer and the thickness of the anode catalyst layer may be equal to or different from each other.

(Method of Manufacturing Catalyst Layer)

Hereinafter, a method for manufacturing the catalyst layer will be described as an exemplary embodiment, but the scope of the present invention is not limited to the following embodiment. In addition, all the conditions for the components and the materials of the catalyst layer are as described above, and thus, the description thereof is omitted.

First, a support (in this description, also referred to as a "porous support" or a "conductive porous support") is prepared. Specifically, the support may be manufactured as described above in the method of manufacturing the support. By this, pores having a specific pore distribution (pores including micropores and mesopores, a pore volume of the micropore being 0.3 cc/g support or more, and/or a mode radius of a pore distribution of the micropores being 0.3 nm or more and less than 1 nm) can be formed in the support.

Next, the catalyst is supported on the porous support, so that a catalyst powder is prepared. The supporting of the catalyst on the porous support can be performed by a well-known method. For example, a well-known method such as an impregnation method, a liquid phase reduction supporting method, an evaporation drying method, a colloid adsorption method, a spray pyrolysis method, or reverse micelle (micro-emulsion method) may be used. In order to set an average particle diameter of catalyst metals to be within a desired range, after the catalyst metals are supported on a support(s), heat treatment may be performed in a reductive ambience. At this time, a heat treatment temperature is preferably in the range of 300 to 1200° C., more preferably in the range of 500 to 1150° C., particularly preferably in the range of 700 to 1000° C. A reductive ambience is not particularly limited, so long as it contributes to grain growth of the catalyst metals. The heat treatment is preferably performed under a mixed ambience of a reductive gas and an inert gas. The reductive gas is not particularly limited, but a hydrogen ($H_2$) gas is preferred. The inert gas is not particularly limited, helium (He), neon (Ne), argon (Ar), krypton (Kr), xenon (Xe), nitrogen ($N_2$), and the like can be used. The inert gas may be used alone or in a form of a mixture of two or more types of the gases. A heat treatment time is preferably in the range of 0.1 to 2 hours, more preferably in the range of 0.5 to 1.5 hours.

Subsequently, a catalyst ink containing the catalyst powder, polymer electrolyte, and a solvent is prepared. As the solvent, there is no particular limitation. A typical solvent used for forming a catalyst layer may be similarly used. Specifically, water such as tap water, pure water, ion-exchanged water, distilled water, cyclohexanol, a lower alcohol having 1 to 4 carbons such as methanol, ethanol, n-propanol, isopropanol, n-butanol, sec-butanol, isobutanol, and tert-butanol, propylene glycol, benzene, toluene, xylene, or the like may be used. Besides, acetic acid butyl alcohol, dimethyl ether, ethylene glycol, or the like may be used as a solvent. These solvents may be used alone or may be used in a state of a mixture of two or more solvents.

An amount of solvent for preparing the catalyst ink is not particularly limited so long as the electrolyte can be completely dissolved. Specifically, a concentration (a solid content) of the catalyst powder and the polymer electrolyte is preferably in the range of 1 to 50 wt % in the electrode catalyst ink, more preferably in the range of about 5 to 30 wt %.

In the case of using an additive such as a water repellent, a dispersant, a thickener, and a pore-forming agent, the additive may be added to the catalyst ink. In this case, an added amount of the additive is not particularly limited so long as it does not interfere with the above-described effects by the present invention. For example, the added amount of the additive is preferably in the range of 5 to 20 wt %, with respect to the total weight of the electrode catalyst ink.

Next, a surface of a substrate is coated with the catalyst ink. A method of coating the substrate is not particularly limited, but a well-known method may be used. Specifically, a well-known method such as a spray (spray coat) method, a Gulliver printing method, a die coater method, a screen printing method, or a doctor blade method can be used.

As the substrate coated with the catalyst ink, a solid polymer electrolyte membrane (electrolyte layer) or a gas diffusion substrate (gas diffusion layer) may be used. In this case, after the catalyst layer is formed on a surface of a solid polymer electrolyte membrane (electrolyte layer) or a gas diffusion substrate (gas diffusion layer), the resultant laminate may be used as it is for manufacturing a membrane electrode assembly. Alternatively, as the substrate, a peelable substrate such as a polytetrafluoroethylene (PTFE) [Teflon (registered trademark)] sheet can be used, and after a catalyst layer is formed on the substrate, the catalyst layer portion can be peeled off from the substrate, so that the catalyst layer may be obtained.

Finally, the coat layer (film) of the catalyst ink is dried under an air ambience or under an inert gas ambience at a temperature ranging from room temperature to 150° C. for a time ranging from 1 to 60 minutes. By this, the catalyst layer can be formed.

(Membrane Electrode Assembly)

According to another embodiment of the present invention, provided is a membrane electrode assembly for a fuel cell including the above-described electrode catalyst layer for fuel cell. Namely, provided is a membrane electrode assembly for fuel cell which comprises a solid polymer electrolyte membrane 2, a cathode catalyst layer disposed on one side of the electrolyte membrane, an anode catalyst layer disposed on the other side of the electrolyte membrane, and a pair of gas diffusion layers (4a, 4c) interposing the electrolyte membrane 2, the anode catalyst layer 3a, and the cathode catalyst layer 3c. In the membrane electrode assembly, at least one of the cathode catalyst layer and the anode catalyst layer is the catalyst layer according to the embodiment described above.

However, by taking into consideration necessity of improved proton conductivity and improved transport characteristic (gas diffusibility) of a reaction gas (particularly, $O_2$), at least the cathode catalyst layer is preferably the catalyst layer according to the embodiment described above. However, the catalyst layer according to the embodiment is not particularly limited. The catalyst layer may be used as the anode catalyst layer or may be used as the cathode catalyst layer and the anode catalyst layer.

According to further embodiment of the present invention, provided is a fuel cell including the membrane electrode assembly according to the embodiment. Namely, according to one aspect, the present invention provides a fuel cell comprising a pair of anode separator and cathode separator interposing the membrane electrode assembly according to the embodiment.

Hereinafter, members of a PEFC 1 using the catalyst layer according to the embodiment will be described with reference to FIG. 1. However, the present invention has features with respect to the catalyst layer. Therefore, among members constituting the fuel cell, specific forms of members other than the catalyst layer may be appropriately modified with reference to well-known knowledge in the art.

(Electrolyte Membrane)

An electrolyte membrane is configured with a solid polymer electrolyte membrane 2 in the same form illustrated in, for example, FIG. 1. The solid polymer electrolyte membrane 2 serves to selectively transmit protons generated in an anode catalyst layer 3a to a cathode catalyst layer 3c in the thickness direction during the operation of the PEFC 1. In addition, the solid polymer electrolyte membrane 2 also serves as a partition wall for preventing a fuel gas supplied to an anode side from being mixed with an oxidant gas supplied to a cathode side.

An electrolyte material constituting the solid polymer electrolyte membrane 2 is not particularly limited, but well-known knowledge in the art may be appropriately referred to. For example, the fluorine-based polymer electrolyte or the hydrocarbon-based polymer electrolyte described above as the polymer electrolyte can be used. There is no need to use the polymer electrolyte which is necessarily the same as the polymer electrolyte used for the catalyst layer.

A thickness of the electrolyte layer is not particularly limited, but it may be determined by taking into consideration characteristics of the obtained fuel cell. The thickness of the electrolyte layer is typically in the range of about 5 to 300 μm. If the thickness of the electrolyte layer is within such a range, balance between strength during the film formation or durability during the use and output characteristics during the use can be appropriately controlled.

(Gas Diffusion Layer)

A gas diffusion layer (anode gas diffusion layer $4a$, cathode gas diffusion layer $4c$) serves to facilitate diffusion of a gas (fuel gas or oxidant gas) supplied through a gas passage ($6a$, $6c$) of a separator to a catalyst layer ($3a$, $3c$) and also serves as an electron conducting path.

A material constituting a substrate of the gas diffusion layers ($4a$, $4c$) is not particularly limited, but well-known knowledge in the related art may be appropriately referred to. For example, a sheet-shaped material having conductivity and porous property such as a fabric made of carbon, a sheet-shaped paper, felt, and a nonwoven fabric may be exemplified. A thickness of the substrate may be appropriately determined by considering characteristics of the obtained gas diffusion layer. The thickness of the substrate may be in the range of about 30 to 500 μm. If the thickness of the substrate is within such a range, balance between mechanical strength and diffusibility of gas, water, and the like can be appropriately controlled.

The gas diffusion layer preferably includes a water repellent for the purpose of preventing a flooding phenomenon or the like by improving water repellent property. The water repellent is not particularly limited, but fluorine-based polymer materials such as polytetrafluoroethylene (PTFE), polyvinylidene fluoride (PVdF), polyhexafluoropropylene, and tetrafluoroethylene-hexafluoropropylene copolymer (FEP), polypropylene, polyethylene, and the like may be exemplified.

In order to further improve water repellent property, the gas diffusion layer may include a carbon particle layer (microporous layer (MPL), not shown) configured with an assembly of carbon particles including a water repellent provided at the catalyst-layer side of the substrate.

Carbon particles included in the carbon particle layer are not particularly limited, but well-known materials in the art such as carbon black, graphite, and expandable graphite may be appropriately employed. Among the materials, due to excellent electron conductivity and a large specific surface area, carbon black such as oil furnace black, channel black, lamp black, thermal black, and acetylene black can be preferably used. An average particle diameter of the carbon particles may be set to be in the range of about 10 to 100 nm. By this, high water-repellent property by a capillary force can be obtained, and contacting property with the catalyst layer can be improved.

As the water repellent used for the carbon particle layer, the above-described water repellent may be exemplified. Among the materials, due to excellent water repellent property and excellent corrosion resistance during the electrode reaction, the fluorine-based polymer material can be preferably used.

A mixing ratio of the carbon particles and the water repellent in the carbon particle layer may be set to be in the range of weight ratio of about 90:10 to 40:60 (carbon particle: water repellent) by taking into consideration balance between water repellent property and electron conductivity. Meanwhile, a thickness of the carbon particle layer is not particularly limited, but it may be appropriately determined by taking into consideration water repellent property of the obtained gas diffusion layer.

(Method of Manufacturing Membrane Electrode Assembly)

A method of manufacturing a membrane electrode assembly is not particularly limited, and a well-known method in the art may be used. For example, a method which comprises transferring a catalyst layer to a solid polymer electrolyte membrane by using a hot press, or coating a solid polymer electrolyte membrane with a catalyst layer and drying the coating, and joining the resulting laminate with gas diffusion layers, or a method which comprises coating a microporous layer (in the case of not including a microporous layer, one surface of a substrate layer) of a gas diffusion layer with a catalyst layer in advance and drying the resulting product to produce two gas diffusion electrodes (GDEs), and joining both surfaces of the solid polymer electrolyte membrane with the two gas diffusion electrodes by using a hot press can be used. The coating and joining conditions by hot press and the like may be appropriately adjusted according to a type of the polymer electrolyte (perfluorosulfonic acid-based or hydrocarbon-based) in the solid polymer electrolyte membrane or the catalyst layer.

(Separator)

In the case of configuring a fuel cell stack by connecting a plurality of unit fuel cells of polymer electrolyte fuel cells in series, a separator serves to electrically connect the cells in series. The separator also serves as a partition wall for separating a fuel gas, an oxidant gas, and a coolant from each other. In order to secure a passage thereof, as described above, gas passages and coolant passages are preferably installed in each of the separators. As a material constituting the separator, well-known materials in the art of carbon such as dense carbon graphite and a carbon plate, a metal such as a stainless steel, or the like can be employed without limitation. A thickness or size of the separator, a shape or size of the installed passages, and the like are not particularly limited, but they can be appropriately determined by taking into consideration desired output characteristics and the like of the obtained fuel cell.

A manufacturing method for the fuel cell is not particularly limited, and well-known knowledge in the art in the field of fuel cell may be appropriately referred to.

Furthermore, in order that the fuel cell can generate a desired voltage, a fuel cell stack may be formed by connecting a plurality of membrane electrode assemblies in series through a separator. A shape and the like of the fuel cell are not particularly limited, and they may be appropriately determined so as to obtain desired cell characteristics such as a voltage.

The above-described PEFC or membrane electrode assembly uses the catalyst layer having excellent power generation performance and excellent durability. Therefore, the PEFC or membrane electrode assembly shows excellent power generation performance and durability.

The PEFC according to the embodiment and the fuel cell stack using the PEFC can be mounted on a vehicle, for example, as a driving power source.

EXAMPLE

The effects of the present invention will be described with reference to the following Examples and Comparative Examples. However, the scope of the present invention is not limited to the Examples.

Synthesis Example 1

By the followings, a support A having a pore volume of micropores of 0.92 cc/g, a pore volume of mesopores of 1.53 cc/g, a mode diameter of micropores of 0.8 nm, a mode diameter of mesopores of 2.4 nm, and a BET specific surface area of 1600 m$^2$/g was prepared. Specifically, the support A was prepared by the method disclosed in JP-A-2010-208887 or the like.

Synthesis Example 2

By the followings, a support B having a pore volume of micropores of 1.01 cc/g, a pore volume of mesopores of 1.49 cc/g, a mode diameter of micropores of 0.8 nm, a mode diameter of mesopores of 2.4 nm, and a BET specific surface area of 1600 m$^2$/g was prepared. Specifically, the support B was prepared by preparing the support A and pulverizing the support A by a bead mill.

Synthesis Example 3

By the followings, a support C having a pore volume of micropores of 1.04 cc/g, a pore volume of mesopores of 0.92 cc/g, a mode diameter of micropores of 0.65 nm, a mode diameter of mesopores of 1.2 nm, and a BET specific surface area of 1770 m$^2$/g was prepared. Specifically, the support C was prepared by the method disclosed in WO 2009/75264 or the like.

Example 1

The support A manufactured in the Synthesis Example 1 was used, and platinum (Pt) having an average particle diameter of more than 3 nm and 5 nm or less as the catalyst metal was supported on the support at a support ratio of 30 wt %, to prepare a catalyst powder A. To be specific, 46 g of the support A was immersed into 1000 g of a dinitrodiammine platinum nitric acid solution having a platinum concentration of 4.6 wt % (platinum content: 46 g), and after stirring, 100 mL of 100% of ethanol as a reducing agent was added thereto. The resultant mixture was stirred and mixed at a boiling point for 7 hours, so that platinum was supported on the support A. Next, by filtering and drying, the catalyst powder having a support ratio of 30 wt % was obtained. After that, the resulting product was maintained in a hydrogen ambience at a temperature of 900° C. for 1 hour, to yield a catalyst powder A.

The resultant catalyst powder A was tested for pore volumes of micropores and the mesopores, mode diameters of micropores and mesopores, and a BET specific surface area were measured. The results are listed in the following Table 1.

Example 2

A catalyst powder B was obtained by the same processes as those of Example 1, except that the support B manufactured in the Synthesis Example 2 was used instead of the support A in Example 1. The resultant catalyst powder B was tested for pore volumes of micropores and the mesopores, mode diameters of micropores and mesopores, and a BET specific surface area were measured. The results are listed in the following Table 1.

Example 3

A catalyst powder C was obtained by the same processes as those of Example 1, except that the support D was used instead of the support A in Example 1. In this case, the support D is a support (Black Pearls 2000 produced by Cabot) having a pore volume of micropores of 0.49 cc/g, a pore volume of mesopores of 0.50 cc/g, a mode diameter of micropores of 0.45 nm, a mode diameter of mesopores of 1.7 nm, and a BET specific surface area of 1440 m$^2$/g. The resultant catalyst powder C was tested for pore volumes of micropores and the mesopores, mode diameters of micropores and mesopores, and a BET specific surface area were measured. The results are listed in the following Table 1.

Example 4

A catalyst powder D was obtained by the same processes as those of Example 1, except that the support C manufactured in the Synthesis Example 3 was used instead of the support A in Example 1. The resultant catalyst powder D was tested for pore volumes of micropores and the mesopores, mode diameters of micropores and mesopores, and a BET specific surface area were measured. The results are listed in the following Table 1.

Comparative Example 1

Ketjen Black EC300J (Ketjen Black International) (support E) was used, and platinum (Pt) having an average particle diameter of 3 to 5 nm as the catalyst metal was supported on the support at a support ratio of 30 wt %, to prepare a comparative catalyst powder F. To be specific, 46 g of the support A was immersed into 1000 g of a dinitrodiammine platinum nitric acid solution having a platinum concentration of 4.6 wt % (platinum content: 46 g), and after stirring, 100 mL of 100% of ethanol as a reducing agent was added thereto. The resultant mixture was stirred and mixed at a boiling point for 7 hours, so that platinum was supported on the support E. Next, by filtering and drying, a comparative catalyst powder E having a support ratio of 50 wt % was obtained. The resultant comparative catalyst powder E was tested for pore volumes of micropores and the mesopores, mode diameters of micropores and mesopores, and a BET specific surface area were measured. The results are listed in the following Table 1. The pore volumes of micropores and mesopores and the mode diameters of micropores and mesopores of the support before the supporting of Pt are also listed in Table 1.

Figure 4:
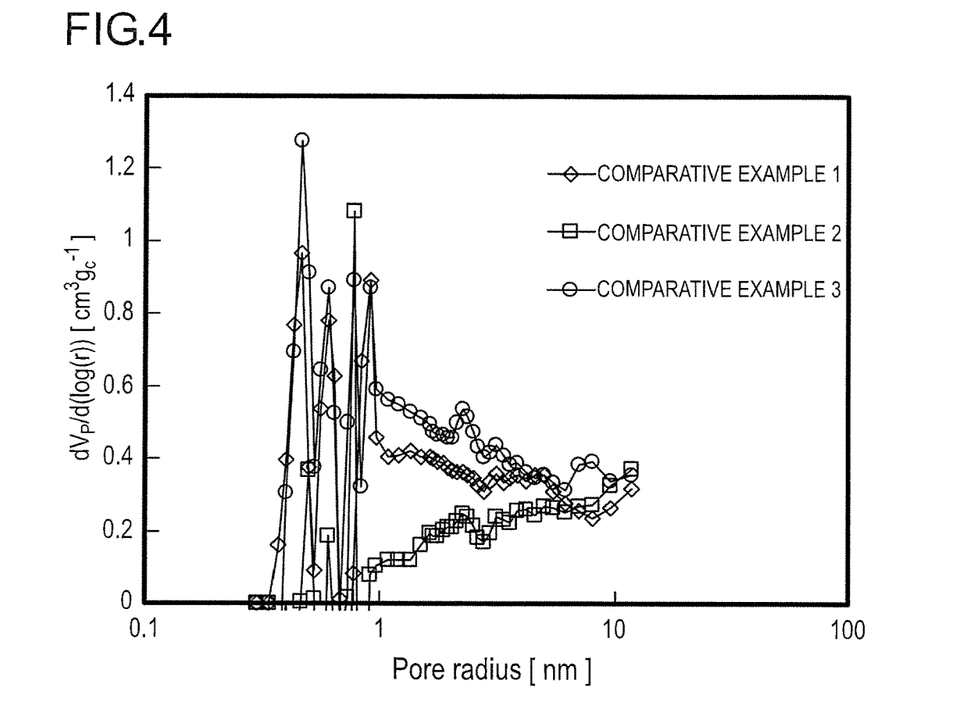
FIG. 4 is a diagram illustrating pore distributions of comparative catalysts F to H of Comparative Examples 1 to 3.

In addition, a pore distribution of the resultant comparative catalyst powder E is shown in FIG. 4. As illustrated in FIG. 4, in the comparative catalyst powder E, the mode diameters of micropores and mesopores could not be clearly observed. Therefore, in the following Table 1, for the comparative catalyst powder E, the mode diameters of micropores and mesopores of the support (before the supporting of Pt) and of the catalyst (after the supporting of Pt) are indicated by "-".

Comparative Example 2

A comparative catalyst powder F was obtained by the same processes as those of Comparative Example 1, except that the graphite Ketjen Black (support F) which had been obtained by calcining the support E (Ketjen Black) in an electric furnace in a nitrogen ambience at a temperature 2000° C. for 1 hour was used as the support instead of the support E in Comparative Example 1. The resultant comparative catalyst powder F was tested for pore volumes of micropores and the mesopores, mode diameters of micropores and mesopores, and a BET specific surface area were measured. The results are listed in the following Table 1. The pore volumes of micropores and mesopores and the mode diameters of micropores and mesopores of the support before the supporting of Pt are also listed in Table 1.

In addition, a pore distribution of the resultant comparative catalyst powder F is shown in FIG. 4. As illustrated in FIG. 4, in the comparative catalyst powder F, the mode diameters of micropores and mesopores could not be clearly observed. Therefore, in the following Table 1, for the comparative catalyst powder F, the mode diameters of micropores and mesopores of the support (before the supporting of Pt) and of the catalyst (after the supporting of Pt) are indicated by "-".

Comparative Example 3

A comparative catalyst powder G was obtained by the same processes as those of Comparative Example 1, except that after supporting platinum on the support in Comparative Example 1, the resultant support was maintained in a hydrogen ambience at a temperature of 900° for 1 hour. The resultant comparative catalyst powder G was tested for pore volumes of micropores and the mesopores, mode diameters of micropores and mesopores, and a BET specific surface area were measured. The results are listed in the following Table 1. The pore volumes of micropores and mesopores and the mode diameters of micropores and mesopores of the support before the supporting of Pt are also listed in Table 1.

In addition, a pore distribution of the resultant comparative catalyst powder G is shown in FIG. 4. As illustrated in FIG. 4, in the comparative catalyst powder F, the mode diameters of micropores and mesopores could not be clearly observed. Therefore, in the following Table 1, for the comparative catalyst powder F, the mode diameters of micropores and mesopores of the support (before the supporting of Pt) and of the catalyst (after the supporting of Pt) are indicated by "-".

Example 5

A catalyst powder H was obtained by the same processes as those of Comparative Example 1, except that the support A was used instead of the support E in Comparative Example 1. The resultant catalyst powder H was tested for pore volumes of micropores and the mesopores, mode diameters of micropores and mesopores, and a BET specific surface area were measured. The results are listed in the following Table 1. The pore volumes of micropores and mesopores and the mode diameters of micropores and mesopores of the support before the supporting of Pt are also listed in Table 1.

It is noted from the Table 1 that although both of the pore volumes of mesopores and micropores in the catalyst powders A to D and H according to the present invention are decreased, the decreased pore volume of mesopores is larger. Therefore, it is considered that in the catalysts according to the present invention, the catalyst metals are selectively supported inside the mesopores. Although it is noted from the Table 1 that the pore volumes of micropores in the catalyst powders A to D and H according to the present invention are slightly decreased, it is estimated that this is because the catalyst metals block entrance portions of the micropores.

Example 6

The catalyst powder A manufactured in Example 1 and an ionomer dispersion liquid (Nafion (registered trademark) D2020, EW=1100 g/mol, produced by DuPont) as a polymer electrolyte were mixed at a weight ratio of the carbon support and the ionomer of 0.9. Next, a cathode catalyst ink was prepared by adding a n-propyl alcohol solution (50%) as a solvent with a solid content (Pt+carbon support+ionomer) of 7 wt %.

Ketjen Black (particle diameter: 30 to 60 nm) was used as a support, and platinum (Pt) having an average particle diameter of 2.5 nm as the catalyst metal was supported thereon at a support ratio of 50 wt %, to obtain a catalyst powder. The catalyst powder and an ionomer dispersion liquid (Nafion (registered trademark) D2020, EW=1100 g/mol, produced by DuPont) as the polymer electrolyte were mixed at a weight ratio of the carbon support and the ionomer of 0.9. Next, an anode catalyst ink was prepared by adding a n-propyl alcohol solution (50%) as a solvent with a solid content (Pt+carbon support+ionomer) of 7 wt %.

Next, a gasket (Teonex produced by Teijin DuPont, thickness: 25 μm (adhesive layer: 10 μm)) was arranged around both surfaces of a polymer electrolyte membrane (NAFION NR211 produced by DuPont, thickness: 25 μm). Then, an exposed portion of one surface of the polymer electrolyte membrane was coated with the catalyst ink having a size of 5 cm×2 cm by a spray coating method. The catalyst ink was dried by maintaining the stage where the spray coating was performed at a temperature of 60° C. for 1 minute, to obtain an electrode catalyst layer. At this time, a supported amount of platinum is 0.15 mg/cm². Next, similarly to the cathode

TABLE 1

| | Support (Before Supporting of Pt) | | | | Support (After Supporting of Pt) | | | | | | |
|---|---|---|---|---|---|---|---|---|---|---|---|
| | Micropore | | Mesopore | | Micropore | | | Mesopore | | | |
| | Pore Volume (cm³/g*¹) | Mode Radius (nm) | Pore Volume (cm³/g*¹) | Mode Radius (nm) | Pore Volume (cm³/g*¹) | Mode Radius (nm) | Decreased Pore Volume (cm³/g*¹) | Pore Volume (cm³/g*¹) | Mode Radius (nm) | Decreased Pore Volume | BET Specific Surface Area (m²/g*²) |
| Example 1 | 0.92 | 0.8 | 1.53 | 2.4 | 0.83 | 0.8 | 0.09 | 1.35 | 2.1 | 0.18 | 1480 |
| Example 2 | 1.01 | 0.8 | 1.49 | 2.4 | 0.87 | 0.8 | 0.14 | 1.28 | 2.4 | 0.21 | 1440 |
| Example 3 | 0.49 | 0.45 | 0.50 | 1.7 | 0.42 | 0.4 | 0.07 | 0.42 | 2.1 | 0.08 | 1210 |
| Example 4 | 1.04 | 0.65 | 0.92 | 1.2 | 1.05 | 0.65 | 0.00 | 0.90 | 1.2 | 0.02 | 1750 |
| Comparative Example 1 | 0.29 | — | 0.35 | — | 0.21 | — | 0.08 | 0.29 | — | 0.06 | 560 |
| Comparative Example 2 | 0.00 | — | 0.14 | — | 0.00 | — | 0.00 | 0.15 | — | 0.00 | 180 |
| Comparative Example 3 | 0.29 | — | 0.35 | — | 0.28 | — | 0.00 | 0.36 | — | −0.01 | 710 |
| Example 5 | 0.92 | 0.8 | 1.53 | 2.4 | 0.63 | 0.8 | 0.29 | 1.14 | 2.1 | 0.4 | 1300 |

*¹Unit of pore volume is cm³/g support.
*²Unit of BET specific surface area is m²/g support.

catalyst layer, an anode catalyst layer was formed by spray coating and heat-treatment on the electrolyte membrane, to obtain a membrane electrode assembly (1) (MEA (1)) of this example.

Example 7

A membrane electrode assembly (2) (MEA (2)) was manufactured by the same processes as those of Example 6, except that the catalyst powder B obtained in Example 2 was used instead of the catalyst powder A in Example 6.

Example 8

A membrane electrode assembly (3) (MEA (3)) was manufactured by the same processes as those of Example 6, except that the catalyst powder C obtained in Example 3 was used instead of the catalyst powder A in Example 6.

Example 9

A membrane electrode assembly (4) (MEA (4)) was manufactured by the same processes as those of Example 6, except that the catalyst powder D obtained in Example 4 was used instead of the catalyst powder A in Example 6.

Comparative Example 4

A comparative membrane electrode assembly (1) (comparative MEA (1)) was manufactured by the same processes as those of Example 6, except that the comparative catalyst powder E obtained in Comparative Example 1 was used instead of the catalyst powder A in Example 6.

Comparative Example 5

A comparative membrane electrode assembly (2) (comparative MEA (2)) was manufactured by the same processes as those of Example 6, except that the comparative catalyst powder F obtained in Comparative Example 2 was used instead of the catalyst powder A in Example 6.

Comparative Example 6

A comparative membrane electrode assembly (3) (comparative MEA (3)) was manufactured by the same processes as those of Example 6, except that the comparative catalyst powder G obtained in Comparative Example 3 was used instead of the catalyst powder A in Example 6.

Example 10

A membrane electrode assembly (5) (MEA (5)) was manufactured by the same processes as those of Example 6, except that the catalyst powder H obtained in Example 5 was used instead of the catalyst powder A in Example 6.

Experiment 1: Evaluation of Oxygen Reduction Reaction (ORR) Activity

The membrane electrode assemblies (1) to (5) manufactured in Examples 6 to 10 and the comparative membrane electrode assemblies (1) to (3) manufactured in Comparative Examples 4 to 6 were evaluated for oxygen reduction reaction activity by measuring power generation current per surface area of platinum ($\mu A/cm^2$ (Pt)) at 0.9 V under the following evaluation conditions. The results are shown in the following Table 2.

[Chem. 2]

<Evaluation Conditions>

Temperature: 80° C.

Gas Component: Hydrogen (Anode Side)/Oxygen (Cathode Side)

Relative Humidity: 100% RH/100% RH

Pressure: 150 kPa(abs)/150 kPa(abs)

Voltage Scan Direction: Anode

Experiment 2: Evaluation of Power Generation Performance

The membrane electrode assemblies (1) to (5) manufactured in Examples 6 to 10 and the comparative membrane electrode assemblies (1) to (3) manufactured in Comparative Examples 4 to 6 were evaluated for power generation performance by measuring voltage (V) at 1.5 A/cm² under the following evaluation conditions. The results are shown in the following Table 2.

[Chem. 3]

<Evaluation Conditions>

Temperature: 80° C.

Gas Component: Hydrogen (Anode Side)/Nitrogen (Cathode Side)

Relative Humidity: 90% RH/90% RH

Pressure: 200 kPa(abs)/200 kPa(abs)

Experiment 3: Evaluation of Gas Transport Resistance

The membrane electrode assemblies (1) to (5) manufactured in Examples 6 to 10 and the comparative membrane electrode assemblies (1) to (3) manufactured in Comparative Examples 4 to 6 were evaluated for gas transport resistance in accordance with the method disclosed in T.Mashio et al. ECS Trans. 11, 529, (2007). The results are shown in the following Table 2.

To be specific, a limiting current density (A/cm²) was measured with dilute oxygen. At this time, gas transport resistance (s/m) was calculated from a slope of the limiting current density (A/cm²) relative to a partial pressure (kPa) of oxygen. Since the gas transport resistance is proportional to a total pressure of the gas, the gas transport resistance can be divided into a component depending on the total pressure of the gas (gas transport resistance by diffusion of molecules) and a component not depending on the total pressure of the gas. Among these, the former is a transport resistance component in pores having such a relatively large size as 100 nm or more existing in the gas diffusion layer or the like, and the latter is a transport resistance component in pores having such a relatively small size as less than 100 nm existing in the catalyst layer or the like. In this manner, the total pressure dependency of gas transport resistance was measured, and the component not depending on the total pressure was extracted, so that the gas transport resistance in the catalyst layer was obtained.

TABLE 2

| | Oxygen Reduction Reaction Activity Power Generation Current (μA/cm² (Pt)) per Surface Area of Platinum at 0.9 V | Power Generation Performance Voltage at 1.5 A/cm² (V) | Gas Transportability Gas Transport Resistance (s/m) |
|---|---|---|---|
| Example 6 | 932 | 0.604 | 3.6 |
| Example 7 | 820 | 0.611 | 6.4 |
| Example 8 | 813 | 0.594 | 7.9 |
| Example 9 | 828 | 0.671 | 1.1 |
| Comparative Example 4 | 339 | 0.466 | 20.4 |
| Comparative Example 5 | 378 | 0.347 | 16.0 |
| Comparative Example 6 | 581 | 0.482 | 16.4 |
| Example 10 | 430 | 0.578 | 10.3 |

It is noted from the Table 2 that the MEAs (1) to (5) using the catalyst according to the present invention have a significantly lower gas transport resistance and more excellent catalyst activity (oxygen reduction reaction activity) and power generation performance in comparison with the MEAs (1) to (3) which do not have the pore distribution defined by the present invention. It is considered from the results in the Tables 1 and that the catalyst according to the present invention has improved gas transportability and the catalyst metals inside the mesopores can form three phase boundary with water in an uncontacted state with the electrolyte, so that a high catalyst activity can be exhibited.

The present application is based on the Japanese Patent Application No. 2013-092911 filed on Apr. 25, 2013, the entire disclosed contents of which are incorporated herein by reference.

DESCRIPTION OF REFERENCE SIGNS

1 Polymer electrolyte fuel cell (PEFC),
2 Solid polymer electrolyte membrane,
3 Catalyst layer,
3a Anode catalyst layer,
3c Cathode catalyst layer,
4a Anode gas diffusion layer,
4c Cathode gas diffusion layer,
5 Separator,
5a Anode separator,
5c Cathode separator,
6a Anode gas passage,
6c Cathode gas passage,
7 Coolant passage,
10 Membrane electrode assembly (MEA),
20 Catalyst,
22 Catalyst metal,
23 Support,
24 Mesopore,
25 Micropore,
26 Electrolyte.

The invention claimed is:

1. A catalyst comprising a catalyst support and a catalyst metal supported on the catalyst support,
wherein the catalyst includes pores having a radius of less than 1 nm and pores having a radius of 1 nm or more,
wherein a pore volume of the pores having a radius of less than 1 nm is 0.3 cc/g support to 2 cc/g support,
wherein the catalyst metal has particles supported inside the pores having a radius of 1 nm or more and has particles supported on an outer surface of the catalyst support,
wherein a number of the particles of the catalyst metal supported inside the pores having a radius of 1 nm or more is greater than a number of the particles of the catalyst metal supported on the outer surface of the catalyst support, and
wherein the outer surface of the catalyst support is not an inner surface of the pores having a radius of 1 nm or more.

2. The catalyst according to claim 1, wherein a pore volume of the pores having a radius of less than 1 nm is 0.83 cc/g support to 2 cc/g support.

3. The catalyst according to claim 1, wherein a mode radius of a pore distribution of the pores having a radius of less than 1 nm is 0.3 nm or more and less than 1 nm.

4. The catalyst according to claim 1, wherein an average particle diameter of the catalyst metal is 3 nm or more.

5. The catalyst according to claim 1, wherein a pore volume of the pores having a radius of 1 nm or more is 0.4 cc/g support or more.

6. The catalyst according to claim 1, wherein a mode radius of a pore distribution of the pores having a radius of 1 nm or more of the catalyst is in the range of 1 to 5 nm.

7. The catalyst according to claim 1, wherein a BET specific surface area of the catalyst is 1000 m²/g support or more.

8. The catalyst according to claim 7, wherein a BET specific surface area of the catalyst is 1440 m²/g support or more.

9. The catalyst according to claim 1, wherein the catalyst metal is platinum or includes platinum and a metal component other than platinum.

10. An electrode catalyst layer for a fuel cell comprising the catalyst set forth in claim 1, and an electrolyte.

11. A membrane electrode assembly for a fuel cell comprising the electrode catalyst layer for a fuel cell set forth in claim 10.

12. A fuel cell comprising the membrane electrode assembly for a fuel cell set forth in claim 11.

13. The catalyst according to claim 1, wherein a mode radius of a pore distribution of the pores having a radius of 1 nm or more of the catalyst is in the range of 1 to 3 nm.

14. The catalyst according to claim 1, wherein a ratio of (1) decreased pore volume of the pores having a radius of less than 1 nm before and after the supporting to (2) the pore volume of the pores having a radius of less than 1 nm before the supporting is 29/92 or less.

* * * * *